(12) United States Patent
Choy et al.

(10) Patent No.: US 10,249,877 B2
(45) Date of Patent: *Apr. 2, 2019

(54) LITHIUM IRON PHOSPHATE HAVING OLIVINE STRUCTURE AND METHOD FOR ANALYZING THE SAME

(75) Inventors: Sanghoon Choy, Daejeon (KR); Yong Tae Lee, Jeonju-Si (KR); Hong-Kyu Park, Daejeon (KR); Soo Min Park, Daejeon (KR); Hyo-Shik Kil, Daejeon (KR); Cheol-Hee Park, Daejeon (KR)

(73) Assignee: LG Chem, Ltd. (KR)

( * ) Notice: Subject to any disclaimer, the term of this patent is extended or adjusted under 35 U.S.C. 154(b) by 512 days.

This patent is subject to a terminal disclaimer.

(21) Appl. No.: 12/709,021

(22) Filed: Feb. 19, 2010

(65) Prior Publication Data

US 2010/0261060 A1    Oct. 14, 2010

Related U.S. Application Data

(63) Continuation of application No. PCT/KR2009/006086, filed on Oct. 21, 2009.

(30) Foreign Application Priority Data

Oct. 22, 2008 (KR) .................. 10-2008-0103569

(51) Int. Cl.
*H01M 4/58* (2010.01)
*H01M 4/90* (2006.01)
(Continued)

(52) U.S. Cl.
CPC .......... *H01M 4/5825* (2013.01); *C01B 25/45* (2013.01); *H01M 4/624* (2013.01); *H01M 4/136* (2013.01);
(Continued)

(58) Field of Classification Search
USPC ....................... 429/221; 252/182.1
See application file for complete search history.

(56) References Cited

U.S. PATENT DOCUMENTS

| 6,645,452 B1 | 11/2003 | Barker et al. |
| 6,960,331 B2 | 11/2005 | Barker et al. |

(Continued)

FOREIGN PATENT DOCUMENTS

| CA | 2537278 | * 6/2005 | ............ C01B 25/45 |
| CA | 2741042 A1 | 4/2010 | |

(Continued)

OTHER PUBLICATIONS

Lee, J et al. "Synthesis of LiFePO4 micro and nanoparticles in supercritical water", Materials Letters 60 (2006) pp. 2105-2109.
(Continued)

*Primary Examiner* — Jun Li
(74) *Attorney, Agent, or Firm* — Lerner, David, Littenberg, Krumholz & Mentlik, LLP (57) ABSTRACT

Provided is an olivine-type lithium iron phosphate having a composition represented by Formula I, comprising 0.1 to 5% by weight of $Li_3PO_4$, and comprising no $Li_2CO_3$ or, if present, comprising $Li_2CO_3$ in an amount less than 0.25% by weight: $Li_{1+a}Fe_{1-x}M_x(PO_{4-b})X_b$ (I) wherein M, X, a, x and b are as defined above.

The lithium iron phosphate comprises no lithium carbonate ($Li_2CO_3$) or, if present, comprises the $Li_2CO_3$ in an extremely small amount, and comprises $Li_3PO_4$ having superior electrochemical stability, thermal stability and ionic conductivity, thus advantageously imparting high-temperature and storage stability as well as stability and rate properties to lithium secondary batteries, when used as a cathode active material for the lithium secondary batteries.

9 Claims, 3 Drawing Sheets

(51) Int. Cl.

| | | |
|---|---|---|
| *G01N 23/20* | (2018.01) | |
| *G01N 33/00* | (2006.01) | |
| *C01B 25/45* | (2006.01) | |
| *H01M 4/62* | (2006.01) | |
| *H01M 4/136* | (2010.01) | |
| *H01M 10/0525* | (2010.01) | |
| *H01M 4/02* | (2006.01) | |

(52) U.S. Cl.
CPC ........ *H01M 4/625* (2013.01); *H01M 10/0525* (2013.01); *H01M 2004/021* (2013.01); *Y10T 436/20* (2015.01)

(56) References Cited

U.S. PATENT DOCUMENTS

| | | |
|---|---|---|
| 7,285,260 B2 | 10/2007 | Armand et al. |
| 7,534,408 B2 | 5/2009 | Gauthier et al. |
| 2002/0106562 A1 | 8/2002 | Sato et al. |
| 2004/0033360 A1 | 2/2004 | Armand et al. |
| 2004/0151649 A1 | 8/2004 | Hemmer et al. |
| 2006/0204848 A1 | 9/2006 | Franger et al. |
| 2006/0233696 A1 | 10/2006 | Paulsen et al. |
| 2006/0263286 A1 | 11/2006 | Wu et al. |
| 2007/0207080 A1 | 9/2007 | Yang |
| 2008/0222881 A1* | 9/2008 | Yu et al. ........................ 29/623.1 |
| 2008/0241690 A1* | 10/2008 | Delacourt ................. C01B 25/37 429/221 |
| 2009/0017378 A1* | 1/2009 | Charest ................. H01M 4/131 429/212 |
| 2009/0301866 A1* | 12/2009 | Zaghib ................. H01M 4/0404 204/242 |
| 2010/0227221 A1 | 9/2010 | Chang et al. |
| 2010/0323245 A1* | 12/2010 | Liang .......................... 429/231.5 |

FOREIGN PATENT DOCUMENTS

| | | |
|---|---|---|
| CN | 1615554 A | 5/2005 |
| CN | 1726167 A | 1/2006 |
| EP | 1198019 A2 | 4/2002 |
| EP | 1489672 A1 | 12/2004 |
| JP | 2000-12088 A | 1/2000 |
| JP | 2001-110414 A | 4/2001 |
| JP | 2001-220125 A | 8/2001 |
| JP | 2001-281175 A | 10/2001 |
| JP | 2004-20519 A | 1/2004 |
| JP | 2004-95386 A | 3/2004 |
| JP | 2005-50556 A | 2/2005 |
| JP | 2005-116393 A | 4/2005 |
| JP | 2005-310800 A | 11/2005 |
| JP | 2005-322550 A | 11/2005 |
| JP | 2006-66081 A | 3/2006 |
| JP | 2008-12088 A | 1/2008 |
| JP | 2008-204701 A | 9/2008 |
| JP | 2009-32656 A | 2/2009 |
| JP | 2009-54576 A | 3/2009 |
| JP | 2009-263222 A | 11/2009 |
| KR | 10-0673303 B1 | 1/2007 |
| KR | 10-0805910 B1 | 2/2008 |
| KR | 10-0835127 B1 | 6/2008 |
| KR | 10-0898236 B1 | 5/2009 |
| TW | 200736165 A | 10/2007 |
| WO | WO 2006/018921 A1 | 2/2006 |
| WO | WO 2008/067677 A1 | 6/2008 |

OTHER PUBLICATIONS

Berbenni et al., "Thermoanalytical (TGA-DSC) and high temperature X-ray diffraction (HT-XRD) study of the thermal decomposition processes in $Li_2CO_3$—MnO mixtures," Journal of Analytical and Applied Pyrolysis, vol. 64, pp. 43-58, 2002.

Extended European Search Report for European Application No. 09822201.1 dated Aug. 30, 2012.

Kim et al., "Effect of synthesis conditions on the properties of $LiFePO_4$ for secondary lithium batteries," Journal of Power Sources, vol. 159, pp. 237-240, 2006.

Yu et al., "Impurities in $LiFePO_4$ and Their Influence on Material Characteristics," Journal of the Electrochemical Society, vol. 155, No. 7, pp. A526-A530, 2008.

Indian Office Action issued in Indian Patent Application No. 2840/DELNP/2011 on Jan. 21, 2015.

Lee et al., "Synthesis of $LiFePO_4$ micro and nanoparticles in supercritical water", Materials Letters, vol. 60, Issues 17-18 (2006) pp. 2105-2109.

Wang et al., "Electrochemical performance in Na-incorporated nonstoichiometric $LiFePO_4$/C composites with controllable impurity phases", Electrochimica Acta, vol. 62 (2012) pp. 416-423.

Chung et al., "Electronically conductive phospho-olivines as lithium storage electrodes," Nature Materials, vol. 1, Oct. 2002, pp. 123-128.

* cited by examiner

LITHIUM IRON PHOSPHATE HAVING OLIVINE STRUCTURE AND METHOD FOR ANALYZING THE SAME

This application is a Continuation of PCT International Application No. PCT/KR2009/006086 filed on Oct. 21, 2009, which designated the United States, and on which priority is claimed under 35 U.S.C. § 120. This application also claims priority under 35 U.S.C. § 119(a) on Patent Application No. 10-2008-0103569 filed in the Republic of Korea on Oct. 22, 2008. The entire contents of each of the above documents is hereby incorporated by reference.

FIELD OF THE INVENTION

The present invention relates to lithium iron phosphate having an olivine structure and a method for analyzing the same. More specifically, the present invention relates to an olivine-type lithium iron phosphate having a composition of Formula I and comprising $Li_3PO_4$ and/or $Li_2CO_3$.

BACKGROUND OF THE INVENTION

Technological development and increased demand for mobile equipment have led to a rapid increase in the demand for secondary batteries as energy sources. Among these secondary batteries, lithium secondary batteries having high energy density and voltage, long life span and low self-discharge are commercially available and widely used.

The lithium secondary batteries generally use a carbon material as an anode active material. Also, the use of lithium metals, sulfur compounds, silicon compounds, tin compounds and the like as the anode active material are considered. Meanwhile, the lithium secondary batteries generally use lithium cobalt composite oxide ($LiCoO_2$) as a cathode active material. Also, the use of lithium-manganese composite oxides such as $LiMnO_2$ having a layered crystal structure and $LiMn_2O_4$ having a spinel crystal structure and lithium nickel composite oxide ($LiNiO_2$) as the cathode active material has been considered.

$LiCoO_2$ is currently used owing to superior physical properties such as cycle life, but has disadvantages of low stability and high-cost due to use of cobalt, which suffers from natural resource limitations, and limitations of mass-use as a power source for electric automobiles. $LiNiO_2$ is unsuitable for practical application to mass-production at a reasonable cost due to many features associated with preparation methods thereof. Lithium manganese oxides such as $LiMnO_2$ and $LiMn_2O_4$ have a disadvantage of short cycle life.

In recent years, methods to use lithium transition metal phosphate as a cathode active material have been researched. Lithium transition metal phosphate is largely divided into $Li_xM_2(PO_4)_3$ having a NASICON structure and $LiMPO_4$ having an olivine structure, and is found to exhibit superior high-temperature stability, as compared to conventional $LiCoO_2$. To date, $Li_3V_2(PO_4)_3$ is the most widely known NASICON structure compound, and LiFePO4 and Li(Mn, Fe)$PO_4$ are the most widely known olivine structure compounds.

Among olivine structure compounds, $LiFePO_4$ has a high voltage of 3.5 V and a high bulk density of 3.6 $g/cm^3$, as compared to lithium, has a theoretical capacity of 170 mAh/g and exhibits superior high-temperature stability, as compared to cobalt (Co), and utilizes cheap Fe, thus being highly applicable as the cathode active material for lithium secondary batteries.

However, $LiFePO_4$ exhibits low electrical conductivity, thus disadvantageously causing an increase in inner resistance of batteries, when used as the cathode active material. This increase also leads to an increase in polarization potential, when electric circuits close, and thus a decrease in battery capacity.

In this regard, prior arts including Japanese Patent Application Publication No. 2001-110414, etc. disclose incorporation of a conductive material into olivine-type metal phosphate to improve conductivity.

However, $LiFePO_4$ is generally prepared by a solid-phase method or a hydrothermal method using $Li_2CO_3$ or LiOH as a lithium source. These methods have a disadvantage in that a large volume of $Li_2CO_3$ is produced during baking due to lithium and carbon sources added to improve electrical conductivity.

Such $Li_2CO_3$ may be decomposed upon charge or react with an electrolytic solution to produce $CO_2$ gas, thus disadvantageously generating excessive amount of gas during storage or cycles. This also disadvantageously causes a swelling phenomenon and deterioration in high-temperature stability.

Accordingly, there is an increasing need for lithium iron phosphate such as $LiFePO_4$ that exhibits superior electrical conductivity, while containing a minimum amount of $Li_2CO_3$.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered that lithium iron phosphate having an olivine crystal structure, containing $Li_3PO_4$ and a minimum of $Li_2CO_3$ can decrease a swelling phenomenon and thus improve not only high-temperature stability, but also rate properties owing to high ionic conductivity. Based on this discovery, the present invention has been completed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

1. Olivine-Type Lithium Iron Phosphate

In accordance with an aspect of the present invention, the above and other objects can be accomplished by the provision of an olivine-type lithium iron phosphate having a composition represented by Formula I below, comprising 0.1 to 5% by weight of $Li_3PO_4$, based on the total weight of the compound, and comprising no $Li_2CO_3$ or, if present, comprising $Li_2CO_3$ in an amount less than 0.25% by weight:

$$Li_{1+a}Fe_{1-x}M_x(PO_{4-b})X_b \quad (I)$$

wherein
M is selected from Al, Mg, Ti and combinations thereof;
X is selected from F, S, N and combinations thereof;
−0.5≤a≤+0.5;
0≤x≤0.5; and
0≤b≤0.1.

The lithium iron phosphate comprises an extremely small amount of lithium carbonate, thus decreasing gas generation and exhibiting superior high-temperature and storage stabilities. In addition, the lithium iron phosphate comprises $Li_3PO_4$ that has considerably superior electrochemical stability, thermal stability and ionic conductivity, thus advantageously exhibiting excellent rate properties, when used as a cathode active material for lithium secondary batteries. As such, the idea that the incorporation of $Li_3PO_4$ into lithium iron phosphate causes improvement in electrical conductivity thereof is novel.

As mentioned above, $Li_2CO_3$ may be formed by reaction of a carbon material added to improve conductivity with lithium ions, or be an unreacted residual lithium precursor. It is preferred that the content of $Li_2CO_3$ be as little as possible. In particular, the swelling phenomenon may increase, when $Li_2CO_3$ is present in an amount not less than 0.25% by weight. Accordingly, the $Li_2CO_3$ is preferably present in an amount less than 0.25% by weight, more preferably, not more than 0.1% by weight.

Meanwhile, $Li_3PO_4$ exhibits considerably excellent electrochemical stability and superior thermal stability. Accordingly, $Li_3PO_4$ can improve high-temperature stability of the olivine-type lithium iron phosphate without inducing side-reactions in batteries and deteriorating charge/discharge properties thereof. Furthermore, $Li_3PO_4$ can improve ionic conductivity, thus advantageously compensating for low conductivity of olivine-type lithium iron phosphate and improving rate properties of batteries. When $Li_3PO_4$ is present in an amount exceeding 5% by weight, battery capacity is disadvantageously deteriorated under equivalent specifications. Accordingly, it is required that $Li_3PO_4$ be present in an amount of 0.1 to 5% by weight.

The $Li_3PO_4$ may be separately added or formed in the process of preparing lithium iron phosphate by a supercritical hydrothermal method.

The olivine-type lithium iron phosphate comprising an appreciate amount of $Li_3PO_4$ and/or $Li_2CO_3$ according to the present invention has a pH of 8.5 to 11.5, more preferably of 10.0 to 11.5.

In a preferred embodiment, the content of $Li_3PO_4$ and $Li_2CO_3$ may be measured by pH titration.

More specifically, the content of $Li_3PO_4$ and $Li_2CO_3$ may be determined by mixing 10 g of a sample with 100 ml of distilled water, followed by stirring for 5 minute, filtering and titrating with acid such as HCl.

The solution (100 ml) contains substantially all of $Li_3PO_4$ and $Li_2CO_3$ in the sample. Alternatively, the solution may be prepared by repeatedly soaking and decanting the sample (10 g). This case is not greatly dependent upon factors such as a total time for which the sample is added.

Those skilled in the art will appreciate that the kind, concentration, pH level, etc of acid used for titration may be suitably varied, as needed. These variations are to be construed as falling within the scope of the invention.

It is preferred that most of the $Li_2CO_3$ and $Li_3PO_4$ be present on the surface of olivine-type lithium iron phosphate particles. This is because, in the case where $Li_3PO_4$ is present on the surface of particles, the $Li_3PO_4$ can advantageously efficiently improve ionic conductivity, while, in the case where $Li_2CO_3$ is present in olivine-type lithium iron phosphate particles, it is difficult to remove the particles. Meanwhile, the olivine-type lithium iron phosphate has a composition of Formula I below:

$$Li_{1+a}Fe_{1-x}M_x(PO_{4-b})X_b \quad (I)$$

wherein M is selected from Al, Mg, Ni, Co, Mn, Ti, Ga, Cu, V, Nb, Zr, Ce, In, Zn, Y and combinations thereof;
X is selected from F, S, N and combinations thereof; and
−0.5≤a≤0.5, 0≤x≤0.5, 0≤b≤0.1.

In Formula I, when a, b and x are out of the range defined above, conductivity, capacity or rate properties may be deteriorated or the lithium iron phosphate may lose its olivine structure.

In Formula I, x may be zero and the metal element, M, is an optional element, which is represented by $Li_{1+a}FePO_4$. When the lithium iron phosphate contains M, the olivine crystal structure advantageously becomes highly stable, thereby improving electrical conductivity electrical conductivity. However, it is undesirable that M is present in an amount of 0.5 or higher, because it may induce deterioration in capacity.

Preferred examples of lithium iron phosphate include, but are not limited to, $LiFePO_4$, $Li(Fe,Mn)PO_4$, $Li(Fe,Co)PO_4$, $Li(Fe,Ni)PO_4$ and the like.

In some cases, in order to increase conductivity, the lithium iron phosphate may be coated with a conductive material selected from carbon, precious metals, metals, conductive polymers and combinations thereof. In particular, advantageously, the lithium iron phosphate coated with carbon can efficiently improve conductivity, without greatly increasing preparation costs and weight.

In addition, the shape of the olivine-type lithium iron phosphate is not particularly limited. Preferably, the olivine-type lithium iron phosphate may have a spherical shape in view of tap density.

In a preferred embodiment, the olivine-type lithium iron phosphate may be secondary particles having a mean particle diameter (D50) of 5 to 40 μm formed by aggregating primary particles having a mean particle diameter (D50) of 100 to 300 nm.

When the mean particle diameter of the primary particles is excessively high, ionic conductivity is disadvantageously deteriorated. On the other hand, primary particles having excessively small mean particle diameter are difficult to prepare.

In addition, when the mean particle diameter of secondary particles is excessively large, it is undesirable in that porosity between the secondary particles is increased and tap density is graded. On the other hand, when the mean particle diameter of secondary particles is excessively small, it is undesirable in that the particles cannot exert the process efficiency. In particular, the secondary particles preferably have a mean particle diameter of 5 to 40 μm, in view of slurry mixing and electrode surface smoothness. It is undesirable that the secondary particles have a mean particle diameter of 40 µm or higher, because precipitation slowly occurs upon slurry mixing.

Advantageously, the use of the olivine-type lithium iron phosphate in the form of secondary particles enables reduction in amounts of binder and solvent used to prepare an electrode, shortening of mixing and drying periods and thus improvement in process efficiency.

In a more preferred embodiment, the secondary particles may have a porosity of 15 to 40%. These high porosity secondary particles may become partially deformed during pressing in the preparation of electrode and be converted into primary particles, thus improving electrical conductivity electrical conductivity. As a result, capacity and energy density of electrodes and batteries can be maximized. According to the present invention, the olivine-type lithium iron phosphate may be prepared by a supercritical hydrothermal method.

More specifically, the preparation of lithium iron phosphate may be carried out in accordance with the following steps (a) to (c):

(a) primarily mixing raw materials with an alkalinizing agent to precipitate transition metal hydroxide;

(b) secondarily mixing supercritical or subcritical water with the mixture obtained in step (a) to synthesize lithium metal composite oxide and drying the same; and (c) calcining the lithium metal composite oxide.

In step (a), as a lithium precursor, one of the ingredients, $Li_2CO_3$, $Li(OH)$, $Li(OH).H_2O$, $LiNO_3$ or the like may be used. As an iron (Fe) precursor, a bivalent iron-containing compound such as $FeSO_4$, $FeC_2O_4.2H_2O$ or $FeCl_2$ may be used. As a phosphorus (P) precursor, an ammonium salt such as $H_3PO_4$, $NH_4H_2PO_4$, $(NH_4)_2HPO_4$ or $P_2O_5$ may be used.

In addition, the alkalinizing agent may be alkali metal hydroxide, alkaline earth metal hydroxide or an ammonia compound.

In step (b), the supercritical or subcritical water may have a temperature of 200 to 700° C. under pressure of 180 to 550 bar. In step (c), the calcination temperature may be 600 to 1,200° C.

In addition, the lithium iron phosphate in the form of the secondary particles may be prepared by drying a mixture consisting of primary particles having a predetermined particle diameter, a binder and a solvent, followed by aggregating. Preferably, the primary particles and the binder are present in the mixture in an amount of 5 to 20 wt % and 5 to 20 wt %, respectively, with respect to the weight of the solvent. The porosity of the secondary particles can be controlled by varying the ratio of the primary particles and the solvent. Examples of the solvent used in the step may include all organic solvents including polar solvents such as water and non-polar solvents. Examples of the binder used in the step include, but are not limited to, sucrose and lactose-based sugars, PVDF- or PE-based polymers and cokes which are soluble in a polar solvent.

The dying and preparation of the secondary particles may be carried out at the same time by various methods known in the art, including spray drying, fluidized-bed drying, vibration drying, etc. In particular, rotating spray drying is preferred, because it enables preparation of secondary particles in the form of spheres and thus improves tap density.

The drying may be carried out at 120 to 200° C. under inert gas (e.g., Ar, $N_2$) atmosphere.

2. Cathode Mix

The present invention provides a cathode mix comprising the lithium iron phosphate as a cathode active material. In addition to the cathode active material, the cathode mix may optionally comprise a conductive material, a binder, a filler and the like.

The conductive material is commonly added in an amount of 1 to 30% by weight, based on the total weight of the compound including the cathode active material. Any conductive material may be used without particular limitation so long as it has suitable conductivity without causing adverse chemical changes in the fabricated secondary battery. As examples of the conductive materials that can be used in the present invention, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which helps binding of an active material to a conductive material and current collector. The binder is commonly added in an amount of 1 to 30% by weight, based on the total weight of the compound including the anode active material. Examples of the binder include polyvinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubber, fluoro rubber and various copolymers.

The filler is a component used to inhibit electrode expansion. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

Meanwhile, the cathode active material may be composed of the olivine-type lithium iron phosphate in accordance with the present invention alone, or in combination with other lithium transition metal composite oxides.

Examples of the lithium transition metal composite oxide include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ ($0 \leq y \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides of Formula $LiNi_{1-y}M_yO_2$ (M=Co, Mn, Al, Cu, Fe, Mg, B or Ga, and $0.01 \leq y \leq 0.3$); lithium manganese composite oxides of Formula $LiMn_{2-y}M_yO_2$ (M=Co, Ni, Fe, Cr, Zn or Ta, and $0.01 \leq y \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

3. Cathode

The present invention provides a cathode wherein the cathode mix is applied to a collector.

The cathode for secondary batteries may be prepared by applying a slurry obtained by mixing the cathode mix with a solvent such as NMP to a cathode current collector, followed by drying and press-rolling.

The cathode current collector is generally fabricated to have a thickness of 3 to 500 µm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel which was surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

4. Lithium Secondary Battery

The present invention provides a lithium secondary battery comprising the cathode, the anode, a separator, and a lithium salt-containing non-aqueous electrolyte.

For example, the anode is prepared by applying an anode mix comprising an anode active material to an anode current collector, followed by drying. The anode mix may comprise the afore-mentioned ingredients, i.e., the conductive material, the binder and the filler.

The anode current collector is generally fabricated to have a thickness of 3 to 500 µm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel which was surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolytic solution, solid electrolyte and inorganic solid electrolyte may be utilized.

As the non-aqueous electrolytic solution that can be used in the present invention, for example, mention may be made of non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

5. Method for Analyzing Lithium Iron Phosphate

The present invention also provides a method for analyzing presence of $Li_3PO_4$ and/or $Li_3Fe_2(PO4)_3$ in lithium iron phosphate and its content, if present.

Specifically, in one embodiment, a method to confirm whether or not the lithium iron phosphate having a composition of Formula I and an olivine crystal structure contains $Li_3PO_4$ is provided, which uses x-ray diffraction of an element having Ka of 1.6 to 2. The element having Ka of 1.6 to 2 may be cobalt (Co) or iron (Fe).

The $Li_3PO_4$ is characterized in that it is not readily detectable by Cu or Ka X-ray diffraction due to interference. Accordingly, the inventors of the present invention confirmed through various attempts that the use of X-ray diffraction utilizing an element having Ka of 1.6 to 2 enables efficient analysis of the presence of $Li_3PO_4$.

In addition, in another embodiment, a method to assay the amount of $Li_2CO_3$ and/or $Li_3PO_4$ present in the lithium iron phosphate having a composition of Formula I and an olivine crystal structure is provided, which comprises mixing 10 g of a sample with 100 ml distilled water, stirring the mixture for 5 to 10 minutes, filtering the reaction mixture, titrating the filtrate with acid and measuring pH of the resulting solution.

The method for measuring the content of $Li_2CO_3$ or $Li_3PO_4$ at a considerably high accuracy can be accomplished by pH titration.

Soaking and decanting may be repeatedly performed to allow $Li_2CO_3$ or $Li_3PO_4$ contained in the sample to be present in distilled water and thus improve an accuracy of the content. This process is not greatly dependent upon factors such as total sample-addition time.

There is no limitation to the acid used in the titration. Preferred is HCl.

EXAMPLES

Now, the present invention will be described in more detail with reference to the following examples. These examples are provided only for illustrating the present invention and should not be construed as limiting the scope and spirit of the present invention.

In the present examples, the content of water-soluble base present in a powder was measured according to the following method:

Examples 1-6 and Comparative Example 1

An aqueous solution containing 0.5 mole of iron sulfate ($FeSO_4 \cdot 7H_2O$) and 0.55 mole of phosphate was pumped into a first mixer under a pressure of 270 bar at a rate of 10 ml/min at ambient temperature, and a solution containing ammonia water and lithium hydroxide ($NH_3$ 0.05 mole, $LiOH \cdot H_2O$ 1 mole) was pumped thereto under a predetermined pressure at a rate of 10 ml/min at ambient temperature. A 1% aqueous sucrose ($C_{12}H_{22}O_{11}$, w/w) solution was added to the iron sulfate aqueous solution. About 450° C. ultrapure water was pumped into a second mixer under a pressure of 270 bar at a rate of 120 ml/min. The resulting compound was allowed to stand in the reactor at 380° C. for 15 seconds, and was then cooled and concentrated. The resulting concentrate was dried in a spray drier at 150° C. and calcined in a furnace under nitrogen atmosphere at 700° C. for 10 hours to prepare lithium-iron phosphate ($LiFePO_4$) of Example 1.

Lithium-iron phosphates of Examples 2 to 6 and Comparative Example 1 were prepared in the same manner as in Example 1, while varying pH, as set forth in the following Table 1, by controlling the amount of ammonia added.

[Experimental Example 1] Content Measurement of $Li_2CO_3$ and $Li_3PO_4$ (pH Titration)

First, 10 g of the lithium iron phosphate particles prepared in Example 2 to 6 and Comparative Example 1 was stirred in 100 ml of distilled water for 5 minutes, followed by filtering. Then, a 0.1M HCl solution was added to the resulting filtrate, the mixture was subjected to pH titration with stirring and pH was recorded as a function of time. This experiment was performed until pH reached 3 or lower, and flow rate was suitably determined so that titration took about 20 to 30 minutes. The content of water-soluble base was calculated by the amount of acid used, until pH reached 5 or lower and the water-soluble base was characterized by pH profile behaviors.

Figure 2:
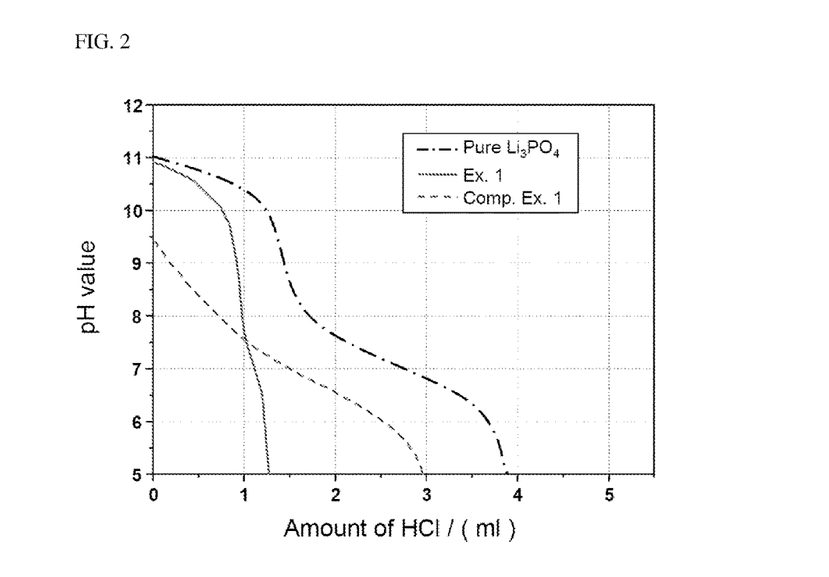
FIG. 2 is a graph showing pH variations in accordance with amounts of HCl added for Example 1, Comparative Example 1 and pure $Li_3PO_4$ in Experimental Example 1.

The results thus obtained are shown in Table 1 below, and a graph showing pH variation as a function of the amount of HCl added for Example 1 and Comparative Example 1 and pure $Li_3PO_4$ is shown in FIG. 2.

TABLE 1

|  | Initial pH | Main ingredient | Amount detected (wt %) |
|---|---|---|---|
| Ex. 1 | 11.30 | $Li_3PO_4$ | 0.31 |
| Ex. 2 | 11.30 | $Li_3PO_4$ | 0.23 |
| Ex. 3 | 10.90 | $Li_3PO_4$ | 0.10 |
| Ex. 4 | 10.55 | $Li_2CO_3$, $Li_3PO_4$ | 0.16 |
| Ex. 5 | 10.44 | $Li_2CO_3$, $Li_3PO_4$ | 0.12 |
| Ex. 6 | 10.31 | $Li_2CO_3$, $Li_3PO_4$ | 0.13 |
| Comp. Ex. 1 | 8.45 | $Li_2CO_3$ | 0.29 |

As can be seen from Table 1 above, lithium iron phosphates according to Examples of the present invention have at least pH 8.5, preferably, at least pH 10.0.

[Experimental Example 2] Confirmation of Presence of $Li_3PO_4$ (Co X-Ray Diffraction)

Figure 1:
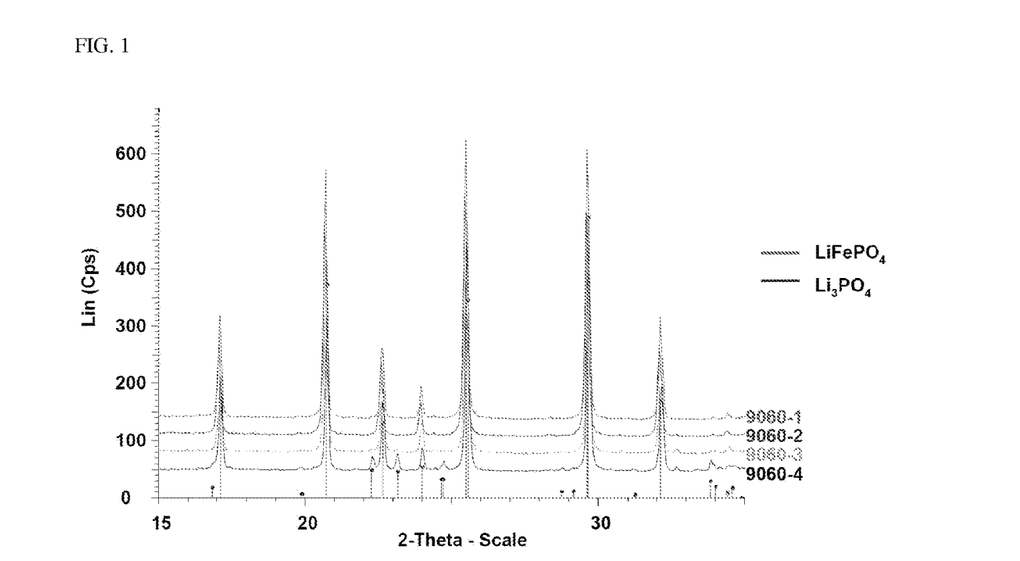
FIG. 1 is a graph showing Co X-ray analysis results of $LiFePO_4$ prepared in Examples to confirm presence of $Li_3PO_4$ in Experimental Example 2.

In order to confirm the presence of $Li_3PO_4$, $LiFePO_4$ prepared in the several Examples was analyzed by Co X-ray and the results thus obtained are shown in FIG. 1.

As can be seen from FIG. 1, although $LiFePO_4$ synthesized under supercritical and super/subcritical conditions contains impurities, only $Li_3PO_4$ is formed. Cu X-ray cannot accurately confirm whether or not $LiFePO_4$ contains impurities due to noise caused by Fe. Accordingly, the structure of impurities can be accurately confirmed by Co X-ray analysis, as shown in FIG. 1.

Impurities may remain in the conventional synthesis of $LiFePO_4$, since an excess of compounds containing Li and P is used for the hydrothermal reaction. However, as can be seen from XRD analysis in FIG. 1, in supercritical synthesis, only $Li_3PO_4$ is formed or $Li_2CO_3$ is formed in an extremely small amount. On the other hand, in accordance with the method (e.g., solid-phase method) where crystallinity is secured, while baking, Li, Fe and P react with carbon, when they react with one another, thus inevitably entailing formation of a relatively great amount of $Li_2CO_3$.

[Experimental Example 3] Characteristic Tests

Secondary batteries were fabricated using the lithium iron phosphate of Examples 1 and 2 and Comparative Example 1 as cathode active materials and were tested for properties such as rate properties or high temperature properties.

Specifically, 90% by weight of lithium iron phosphate as a cathode active material, 5% by weight of Super-P as a conductive material and 5% by weight of PVdF as a binder were added to NMP (N-methyl-2-pyrrolidone) to prepare a cathode mixture slurry. The cathode mixture slurry was coated on one surface of an aluminum foil, followed by drying and pressing, to fabricate a cathode.

95% by weight of carbon as an anode active material, 1.5% by weight of Super-P as a conductive material and 3.5% by weight of PVdF as a binder were added to NMP as a solvent, to prepare an anode mix slurry. The anode mix slurry was coated on one surface of an aluminum foil, followed by drying and pressing, to fabricate an anode.

The cathode and the anode were laminated using Cell-guard™ as a separator to fabricate an electrode assembly and a lithium non-aqueous electrolyte containing 1M $LiPF_6$ in cyclic and linear carbonate mix solvent was added to the electrode assembly to fabricate a battery (423450 polymer battery).

Figure 3:
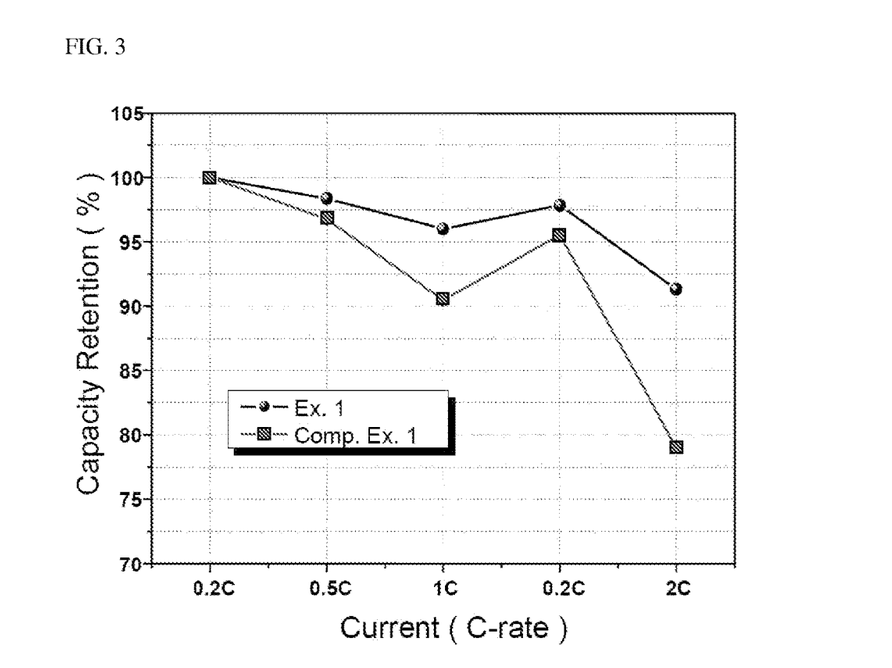
FIG. 3 is a graph showing capacity maintenance with an increase in C-rate for batteries of Example 1 and Comparative Example 1 in Experimental Example 1.

The batteries made of the cathode active materials of Example 1 and Comparative Example 1 were measured for capacity maintenance rate with an increase in C-rate, and the results thus obtained are shown as a graph in FIG. 3. As can be seen from FIG. 3, the battery of the present invention (Example 1) exhibited considerably superior capacity maintenance with an increase in C-rate, as compared to Comparative Example 1.

Figure 4:
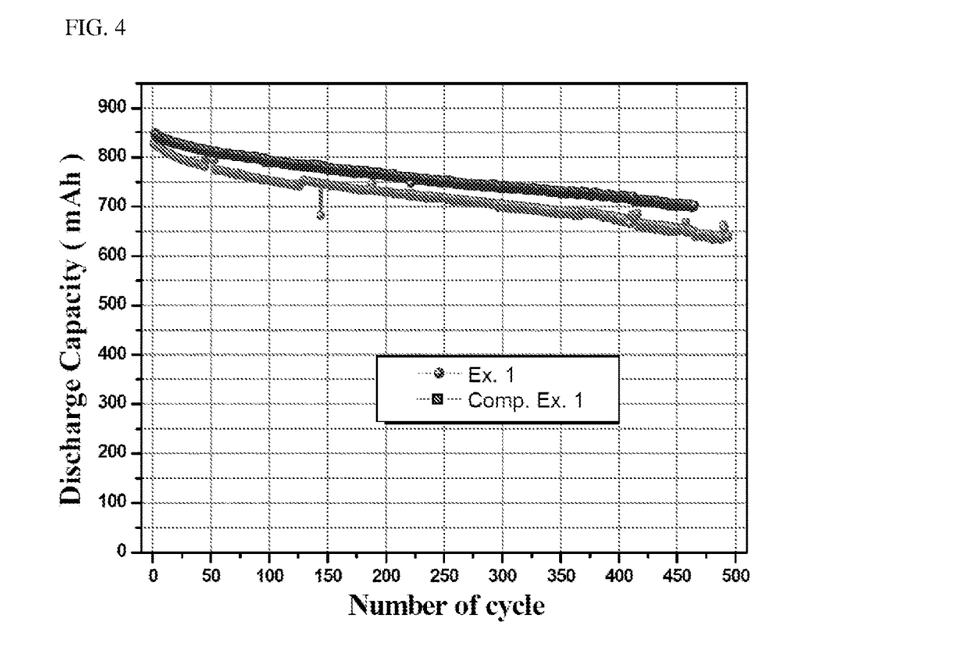
FIG. 4 is a graph showing discharge capacity with an increase in cycles for batteries of Example 1 and Comparative Example 1 in Experimental Example 3.

Also, the batteries were measured for discharge capacity with an increase in cycles and the results thus obtained are shown in FIG. 4. As can be seen from FIG. 4, the battery according to the present invention (Example 1; represented by an upper curve in the graph) exhibited superior cycle properties, as compared to Comparative Example 1.

Figure 5:
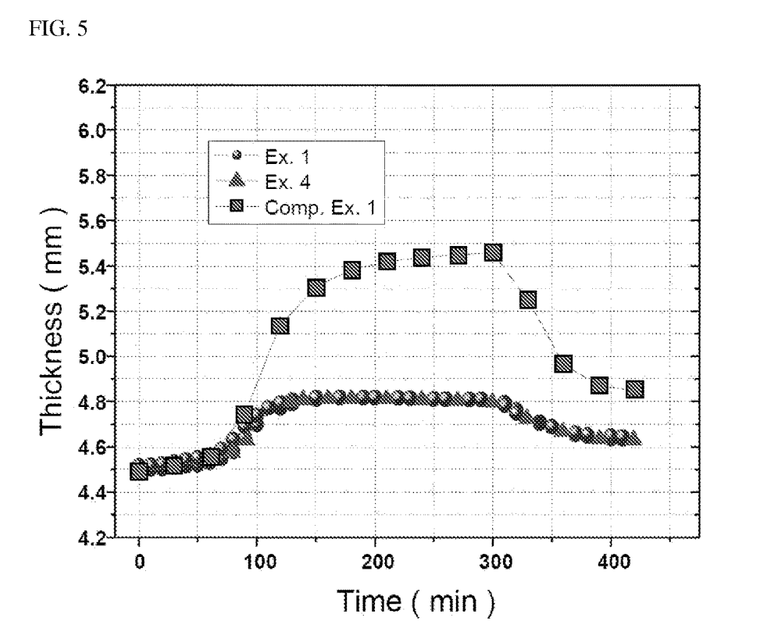
FIG. 5 is a graph showing high-temperature storage properties for batteries of Examples 1 and 4 and Comparative Example 1 in Experimental Example 3.

Additionally, the batteries made of the cathode active materials of Examples 1 and 4 and Comparative Example 1 were measured for high-temperature storage properties and the results thus obtained are shown in a graph of FIG. 5. The high-temperature storage properties were measured by placing fully charged batteries in a chamber at a high temperature of 90° C. for 4 hours and measuring thickness variations in batteries at ambient temperature. As can be seen from FIG. 5, the batteries according to the present invention (Examples 1 and 4) underwent a significantly small thickness increase as a function of time, as compared to Comparative Example 1.

These results demonstrate that the batteries according to the present invention exhibit excellent rate properties, cycle properties and high-temperature storage properties.

INDUSTRIAL APPLICABILITY

As apparent from the above description, the lithium iron phosphate according to the present invention comprises an appropriate amount of $Li_3PO_4$ and in an extremely small amount of $Li_2CO_3$, thus advantageously imparting high-temperature storage stabilities as well as stability and rate properties to lithium secondary batteries, when used as a cathode active material for the lithium secondary batteries.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An olivine-type lithium iron phosphate having a composition of Formula I below, said olivine-type lithium iron phosphate having impurities consisting of $Li_3PO_4$ and optionally $Li_2CO_3$, wherein an amount of the $Li_2CO_3$ is from 0% to less than 0.25% by weight and an amount of $Li_3PO_4$ is from 0.1% to 0.31%:

$$Li_{1+a}Fe_{1-x}M_x(PO_{4-b})X_b \qquad (I)$$

wherein
M is selected from Al, Mg, Ti and combinations thereof,
X is selected from F, S, N and combinations thereof;
−0.5≤a≤+0.5;
0≤x≤0.5; and
0≤b≤0.1,
wherein the amount of $Li_2CO_3$ and $Li_3PO_4$ present in the olivine-type lithium iron phosphate is determined by a pH titration method by mixing 10 g of a sample of the olivine-type lithium iron phosphate with 100 ml of distilled water to form the mixture; stirring the mixture for 5 to 10 minutes to form a reaction mixture; filtering the reaction mixture to form a filtrate; titrating the filtrate with HCl and measuring pH of the resulting solution to characterize the amount of the impurities,
wherein the olivine-type lithium iron phosphate is prepared by a supercritical hydrothermal method at a temperature of 200 to 700° C. under a pressure of 180 to 550 bar, wherein an amount of ammonia added is controlled such that an initial pH of an aqueous solution containing raw materials with an alkaline agent is from 10.31 to 11.30, and
wherein the $Li_3PO_4$ is present on the surface of lithium iron phosphate particles and the $Li_2CO_3$, if present, is present on the surface of lithium iron phosphate particles, and the olivine-type lithium iron phosphate has a pH of 10.0 to 11.5.

2. The olivine-type lithium iron phosphate according to claim 1, wherein the $Li_2CO_3$ is present in an amount of greater than 0% by weight to 0.1% by weight or less.

3. The olivine-type lithium iron phosphate according to claim 1, wherein the olivine-type lithium iron phosphate are secondary particles having a mean particle diameter (D50) of 5 to 40 μm formed by aggregating primary particles having a mean particle diameter (D50) of 100 to 300 nm.

4. The olivine-type lithium iron phosphate according to claim 3, wherein the secondary particles have a porosity of 15 to 40%.

5. A cathode mix comprising the olivine-type lithium iron phosphate according to claim 1, as a cathode active material.

6. A lithium secondary battery comprising an electrode to which the cathode active material according to claim 5 is applied.

7. A cathode mix comprising the olivine-type lithium iron phosphate according to claim 2, as a cathode active material.

8. A cathode mix comprising the olivine-type lithium iron phosphate according to claim 3, as a cathode active material.

9. A cathode mix comprising the olivine-type lithium iron phosphate according to claim 4, as a cathode active material.

* * * * *